United States Patent
Schwab

(10) Patent No.: US 6,328,790 B1
(45) Date of Patent: Dec. 11, 2001

(54) TAPERED GAS INLET FOR GAS TREATMENT SYSTEM

(75) Inventor: James J. Schwab, Napa, CA (US)

(73) Assignee: EnviroCare International, Inc., Novato, CA (US)

( * ) Notice: Subject to any disclaimer, the term of this patent is extended or adjusted under 35 U.S.C. 154(b) by 0 days.

(21) Appl. No.: 09/440,208

(22) Filed: Nov. 15, 1999

(51) Int. Cl.$^7$ .................................................. B01D 47/10
(52) U.S. Cl. .................. 96/323; 261/116; 261/DIG. 54; 55/418; 55/434
(58) Field of Search .................. 55/418, 434; 261/116, 261/78.2, DIG. 54; 96/323

(56) References Cited

U.S. PATENT DOCUMENTS

| | | |
|---|---|---|
| 3,409,131 | * 11/1968 | Petersen et al. ........................ 55/418 |
| 3,456,928 | * 7/1969 | Selway .......................... 261/DIG. 54 |
| 4,790,864 | * 12/1988 | Kostun ................................... 55/418 |

OTHER PUBLICATIONS

EviroCare International Water Injection Calculation Questionnaire.

* cited by examiner

Primary Examiner—David A. Simmons
Assistant Examiner—Robert A. Hopkins
(74) Attorney, Agent, or Firm—Coudert Brothers

(57) ABSTRACT

A compact inlet system for redirecting the flow of gas to a gas treatment apparatus is shown. The inlet system is used to redirect a high volume flow of gas, such as the effluent from an industrial process, by as much as 180° while introducing the gas flow uniformly into the treatment apparatus. The inlet system has a divergent transition section to slow the gas flow, a gas turning section to redirect the gas flow by 90°, and a gas inlet chamber which redirects the gas flow by an additional 90°, while at the same time introducing the gas flow uniformly into a treatment apparatus, such as a gas conditioning tower (GCT). The compact gas inlet chamber of the present invention has an elongate entrance, a circular outlet and a tapered midsection. When used with a GCT the greater uniformity provided by the present invention allows spray nozzles to be positioned within the throat of the entrance venturi of the GCT.

21 Claims, 3 Drawing Sheets

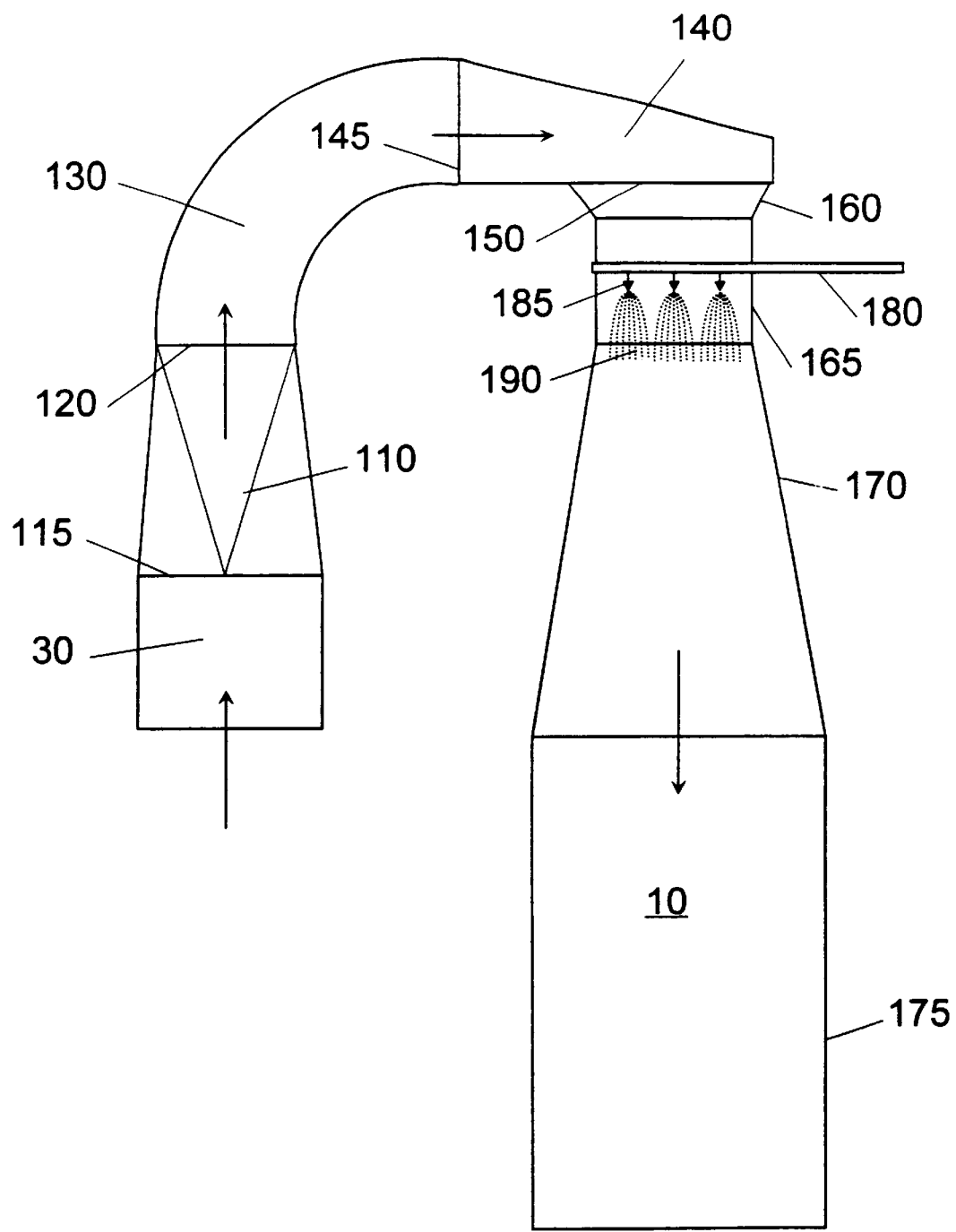
FIG._1

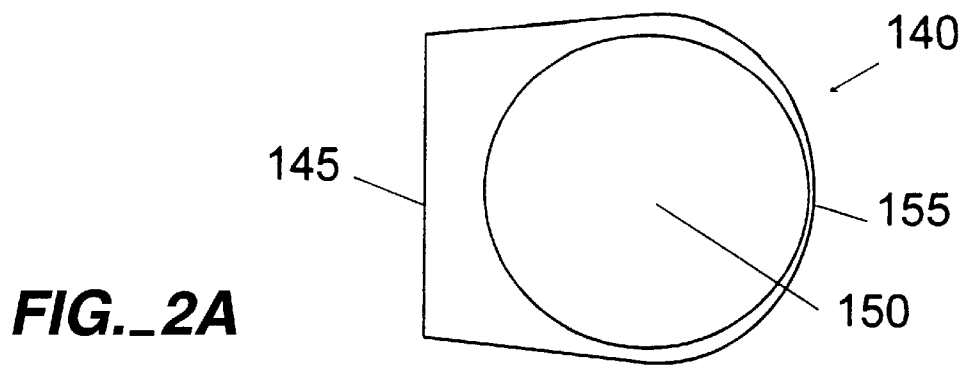
FIG._2A
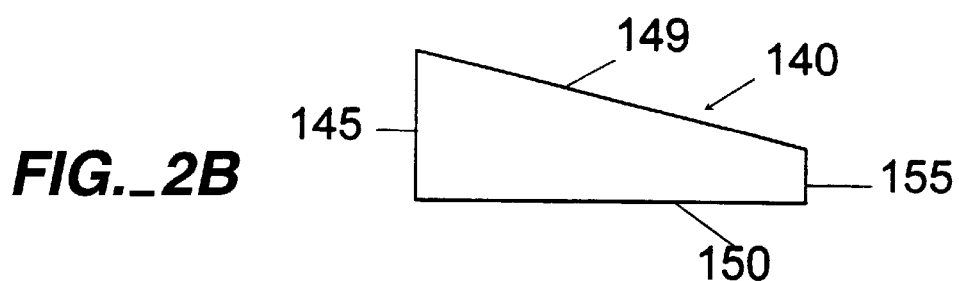
FIG._2B
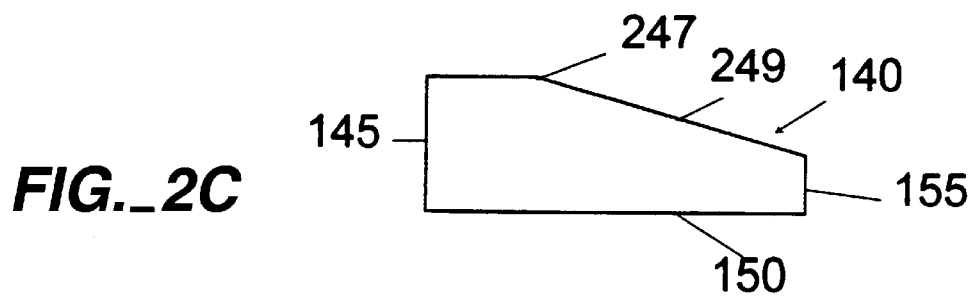
FIG._2C
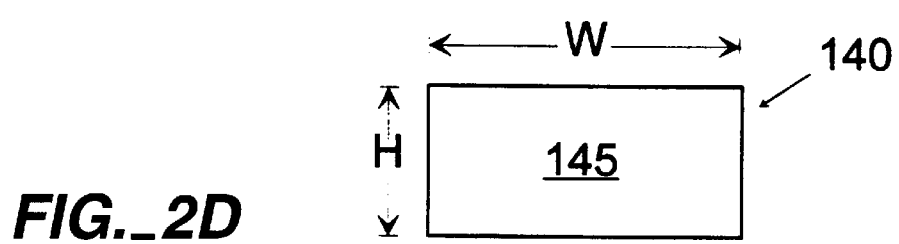
FIG._2D

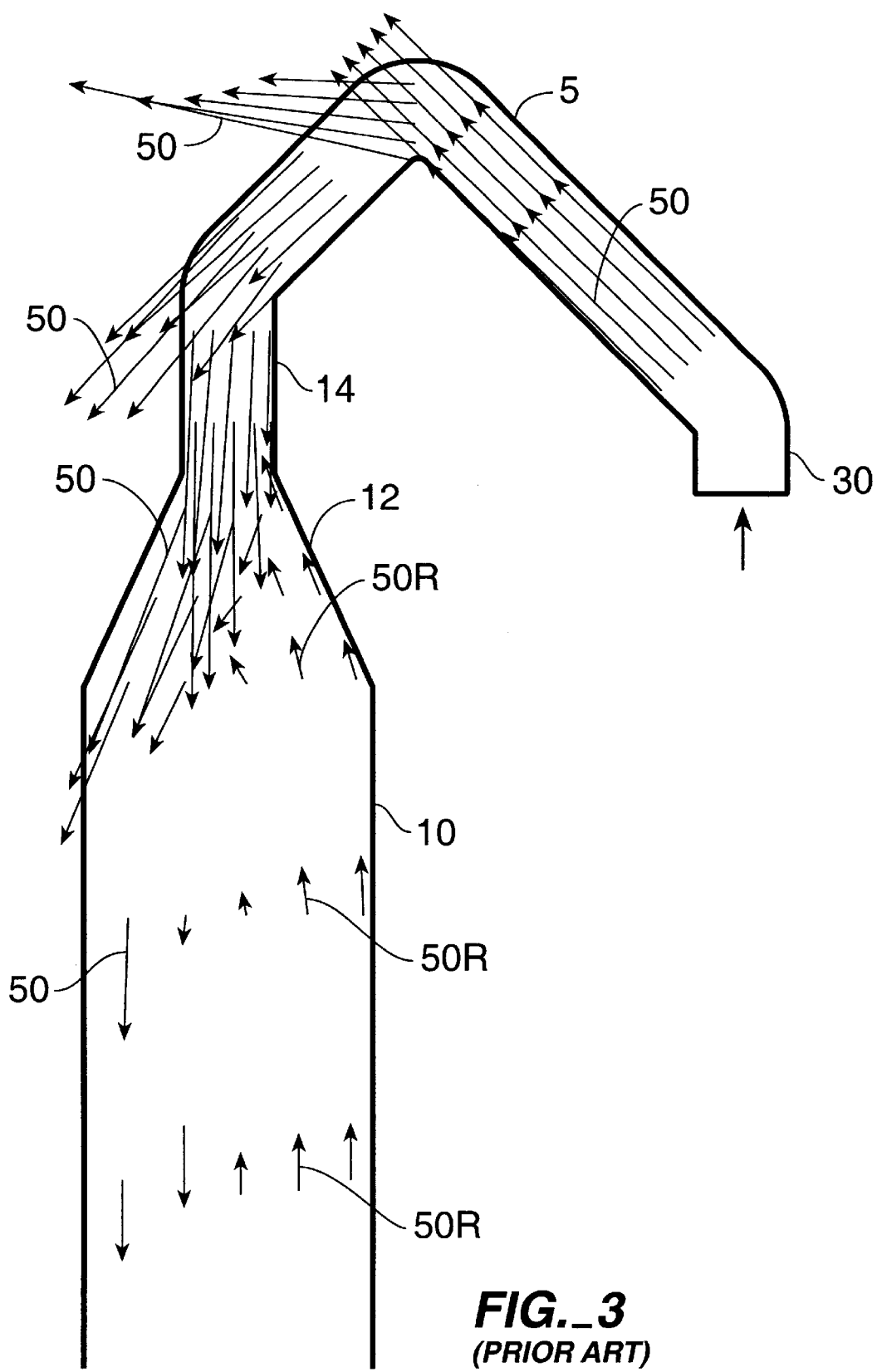
FIG._3
*(PRIOR ART)*

US 6,328,790 B1

TAPERED GAS INLET FOR GAS TREATMENT SYSTEM

FIELD OF THE INVENTION

This invention relates to the field of systems for treating a flow of gas and is particularly related to an inlet system for providing a uniform flow of gases to a treatment chamber, such as a gas conditioning tower.

BACKGROUND OF THE INVENTION

The treatment of flowing gases is a common requirement of various industrial processes. For example, contaminated effluent gases are commonly generated by industrial processes and require treatment to remove pollutants prior to being exhausted into the atmosphere. While the present invention will be described in connection with a pollution control system, those skilled in the art will appreciate that the invention has application to other systems which require the treatment or processing of flowing gases, particularly high volume gas flows.

Many air pollution treatment systems include a variety of stages, with effluent gases flowing through ducts from one treatment stage to another en route to being discharged. For a variety of reasons, e.g., in order to save space, to avoid settling of dust in horizontal ducts, or because certain treatment processes work best when the gas flow is oriented in a particular way, the gas flow often must be redirected as it moves through the system. Specifically, it is often necessary for the gas flow to make an abrupt or "hard" turn, i.e., greater than 30°, prior to the entrance to the treatment device. Many treatment devices operate most efficiently when the gases flow uniformly from the inlet of the device. This presents a difficult problem when the gas flow must be redirected, sometimes by as much as 180°, prior to entering the treatment stage. Where there is a large volume and relatively high flow rate of gases moving through a treatment system, redirecting the gas flow can create substantial non-uniformities in the flow.

For example, a commonly used device in an air pollution control system is a gas conditioning tower ("GCT"). In a GCT water is injected into a flow of hot gases to reduce the temperature and to humidify the gases. A GCT might be used, for example, to condition gases prior to treatment in an electrostatic precipitator where dust particles are removed. In a GCT, gases normally flow vertically from top to bottom, with water being injected into the gas flow near the upper, entrance end of the tower. The time required to evaporate the water spray can be calculated with considerable accuracy if the gas flow is uniform and the spray droplet size distribution is known. However, if the gas flow is not uniform, the calculation becomes much more difficult, and the efficiency of the system is reduced. Non-uniform gas flow results in non-uniform distribution of the spray within the gas flow, non-uniform transit time of the gases through the GCT, coalescence of the spray droplets and consequently inefficient operation of the system.

FIG. 3 is a depiction of the gas flowing at various locations through a GCT 10 with a prior art inlet 5 calculated using computer modeling. Inlet 5 to GCT 10 of FIG. 3 merely redirects the gas flow 180° from vertically upward to vertically downward at the entrance to the GCT. Vectors 50 show the direction and speed of the gas flow at the various locations in the system. As can be seen, the gases are very poorly distributed in the GCT, particularly at the entrance to the GCT, with some of the gas flow being in the upward direction opposite to the overall downward flow. The non-uniformity of the gas flow through the prior art GCT degrades the efficiency, operation and performance of the system.

One prior art solution to flow non-uniformity is to use a series of baffles. This approach, however, has the disadvantage of impeding the gas flow, requiring the use of greater energy to move the gases through the treatment system. Baffles also tend to require greater maintenance due to the collection of dust on the baffle surfaces. Dust build-up also degrades performance.

Accordingly, there is a need for an inlet to a gas processing system which is capable of changing the direction of the gas flow in a compact space and introducing the gas flow substantially uniformly into the entrance of a gas processing system.

Another object of the present invention is to avoid the need to use means for improving flow uniformity which substantially impedes gas flow through the system.

Another object of the present invention is to enable the repositioning of the spray nozzles in a GCT closer to the entrance.

SUMMARY OF THE INVENTION

The present invention comprises a gas treatment apparatus having a compact gas inlet apparatus for both redirecting a flow of gas and for making the redirected gas flow uniformly into the entrance to the gas treatment system. In its broad aspect the present invention is directed to a gas inlet chamber having an elongate entrance and a substantially circular outlet coupled to the entrance to a gas processing chamber, said inlet chamber entrance and outlet having different orientations such that the gas flow is redirected, and a tapered body portion between said entrance and outlet. In one embodiment of the invention the gas inlet apparatus changes the gas flow direction by about ninety degrees and the elongate entrance to the inlet chamber is rectangular with an aspect ratio of at least about 2:1. In another aspect of the invention, the outlet is substantially coaxial with the entrance to the gas processing chamber and the taper of the inlet chamber is uniform from the entrance of the inlet apparatus to the end opposite from the entrance. In a preferred embodiment of the present invention the gas processing chamber is a gas conditioning tower having a venturi at the entrance, the throat of the venturi having a diameter D. In the preferred embodiment, the height of the entrance to the gas inlet is no greater than about 0.75 D, the diameter of the circular outlet is greater than about 1.25 D, the narrowest height of the tapered portion is about 0.25 D or less, and the length of the gas inlet apparatus is less than two times the width of the apparatus.

In another aspect, the present invention comprises a system for redirecting a gas flow to a gas processing chamber comprising a divergent transition section, a turning section and the above described gas inlet chamber. When used in connection with a gas conditioning tower having a venturi at the entrance thereof, the gas inlet of the present invention provides sufficient uniformity to allow positioning of the spray nozzles in the throat of the venturi.

BRIEF DESCRIPTION OF THE DRAWINGS

FIG. 1 is a schematic cross-sectional view of the gas inlet system of the present invention used in connection with a gas conditioning tower (GCT).

FIGS. 2A–2D are views of the gas inlet chamber of the present invention.

FIG. 3 shows the gas flowing at various locations through a GCT with a prior art inlet calculated using computer modeling.

DETAILED DESCRIPTION OF THE INVENTION

Turning first to FIG. 3, shown is a gas conditioning tower (GCT) 10 having inlet 5 of the type know in the prior art. Inlet 5 merely redirects the gas flowing upwardly in a vertical duct 30 180°, so that it enters GCT 10 in an overall downward direction. GCT 10 is used in connection with a larger treatment system for abating pollutants in a gas flow emanating from an industrial process, such as cement production. GCT 10 may be used to humidify and reduce the temperature of gas flow before it flows to an electrostatic precipitator (ESP) where dust particles are removed from the gas flow. As shown, the entrance to GCT to comprises a venturi having a throat 14 and a relatively long exit cone 12. A plurality of spray nozzles (not shown) are positioned within GCT 10 in order to condition the gas flow.

FIG. 3 shows a plurality of gas flow vectors 50 (only some of which are labeled) indicating the velocity (i.e., direction and speed) of the gas in the system at various locations. The vectors depicted in FIG. 3 were calculated using a computer model which the assignee of the present invention (Envirocare International Inc.) uses in the normal course of its business and which has been found to be reliable. The operating conditions (e.g., flow rate, duct size, etc.) used in connection with the computer modeling depicted in FIG. 3 are representative of conditions associated with a GCT used in a cement plant. Vectors 50 in FIG. 3 show that the gas flow entering and traveling through GCT 10 is highly non-uniform. The curved shape of inlet 5 causes the gas flow to the outer periphery of the inlet because of centrifugal forces. The maldistribution of the gas flow causes an eddy current within the GCT, such that in certain locations the gas flows in a reverse direction as shown by vectors 50R.

The non-uniformity of the gas flow in a prior art creates substantial inefficiency in the operation of GCT 10. In will be apparent to those skilled in the art that spray droplets injected into the gas flow will travel in different trajectories, and the treatment of the gas flow will be substantially non-uniform. Droplets injected at different locations will take different amounts of time to evaporate and will transit the GCT at different rates. Since it is undesirable for any droplets to be present at the outlet of the GCT, the length of the GCT must be sufficiently long to accommodate the droplets which travel the furthest distance. Due the very poor gas flow distribution near the entrance to the GCT, in the prior art the spray nozzles are placed in venturi outlet cone 12, downstream of venturi throat 14. Again, this increases the length of the GCT because of the need to ensure that all the injected liquid is evaporated prior to reaching the outlet of the GCT. Finally, the non-uniformity in gas flow and droplet coalescence make it difficult to calculate the time (and distance) needed for complete evaporation.

The problem associated with the highly non-uniform gas flow depicted in FIG. 3 is mitigated if vertical duct 30 is coaxial with GCT 10 with gas flowing downward directly into GCT 10. While this configuration would be better, it is impractical in many situations, due to space and other design constraints, to have a duct of substantial length extend upwardly from the GCT. The minimum length of duct required to produce uniform flow at the entrance to GCT 10 is substantially greater than five times the diameter of the inlet duct to the GCT. Likewise, it might seem desirable for duct 30 to be horizontally oriented such that the gas flow need only be redirected 90° rather than 180°. However, in many pollution control applications it is impractical to use lengthy horizontal ducts because dust settles in the duct which would require frequent maintenance. Similarly, the use of a inlet having a greater radius of curvature would partially mitigate the flow non-uniformity depicted in FIG. 3. However, this approach would also enlarge the overall dimensions of the system and would, in any event, only partially solve the problem.

Turning now to FIG. 1, the gas inlet system of the present invention is shown. The present invention is particularly useful in connection with an air pollution control system for cleansing a large, rapidly flowing volume of contaminated process gases. While the invention is described in connection with such a system, it will be appreciated that the problem of providing a uniform flow of gas to a processing chamber arises in other contexts and the present invention has broad applicability to variety of situations. Accordingly, the present invention is not limited to use in connection with air pollution control systems or with GCT's.

In FIG. 1 the direction of overall gas flow through the system is indicated by arrows. Gases to be treated (or otherwise processed) travel through vertical duct 30 in the upward direction. In a typical installation, gases may be flowing through duct 30 at a rate of approximately 5,000 feet per minute (fpm) or more. Duct 30 is typically cylindrical. The flowing gases then enter a divergent transition section 110. In the preferred embodiment, divergent transition section 110 changes in cross sectional shape (when viewed in a direction which is generally perpendicular to the gas flow) from its circular entrance 115 to its rectangular exit 120. Preferably, the transition from a circular cross section to a rectangle cross section is rapid, such that most of divergent section 110 has the rectangular cross section. Nonetheless, the transition from circular to rectangular cross section should be smooth so as to avoid the creation of turbulence in the gas flow. The overall cross-sectional area of the rectangular portion of divergent transition section 110 near exit 120 is greater than the circular cross-sectional area of duct 30, such that the gases begin to slow within divergent transition section 110.

Next the gas flow is redirected 90° by gas turning section 130. Gas turning section 130 has a rectangular cross section which matches the cross section of divergent transition section 110. The cross sectional area of gas turning section 130 is preferably uniform from its entrance to its exit, with a uniform radius of curvature. Because the gas flow has been significantly slowed by divergent transition section 110 prior to reaching turning section 130, and because turning section also has an increased cross-sectional area (in comparison to duct 30) the flow in the turning section is also significantly slower than in duct 30. This improves the uniformity of the gas flow at the exit of gas turning section 130. In the preferred embodiment the gas flow speed in the gas turning section 130 is approximately one half or less of the gas flow speed in duct 30. Since the centrifugal force is related to the square of the speed, reducing the gas flow speed in turning section by one half reduces the centrifugal force to one fourth or less of what it would be if there were no speed reduction of the gas flow. This substantially mitigates deformation of the gas flow to follow the outside of the curve of the turn.

The design goals for the radius gas turning section 130 involve competing factors. On one hand, the radius should be as small as possible, such that the overall system is as compact as possible and horizontal duct 30 can be placed as close to GCT 10 as possible. On the other hand, enlarging the radius of gas turning section 130 further reduces non-uniformity of the gas flow that exits the gas turning section since a larger radius introduces less centrifugal force. In the preferred embodiment the gas turning section has a minimum radius which is determined in relation to the diameter of the throat of the venturi, as described below.

From the gas turning section, the gas next flows into the gas inlet chamber 140 of the present invention. As depicted in FIGS. 1 and 2A–2D, in the preferred embodiment, gas inlet chamber 140 also changes the direction of the gas flow by 90°, i.e., gas flows into the entrance 145 of inlet chamber 140 from turning section 130 moving generally in the horizontal direction and leaves inlet chamber 140 via exit 150 moving generally in the vertically downward direction. Thus, in the preferred embodiment the gas flow changes direction by 180° in a compact space from duct 30 to the entrance to GCT 10.

It will be appreciated that the present invention is also useful in configurations where there is a need to change the direction of the gas flow by less than 180°, and that, in such situations, some of the components that are described herein may not be required. For example, if the gas flow is in the horizontal direction coming to GCT 10, then gas turning section 130 is not required.

Inlet chamber 140 comprises an elongate entrance 145, a tapered midsection and a circular outlet 150. As used herein the term "elongate" when used in connection with entrance 145 of inlet chamber 140 refers to the fact that the entrance has a width which is greater than the height, as depicted most clearly in FIG. 2D. In the preferred embodiment entrance 145 is rectangular and has an aspect ratio of at least 2:1, i.e., the ratio of the width (W) of entrance 145 to the height (H) is at least 2:1. While the cross-sectional shape of entrance 145 is preferably rectangular, entrance 145 may have another elongate shape, such as a rectangle with rounded corners or an oval. When using another shape for entrance 145 to inlet chamber 140, it is nonetheless preferred that the aspect ratio be at least 2:1, e.g., when the entrance is an oval, the ratio of the major axis of the oval (the greatest width) to the minor axis of the oval (the greatest height).

Preferably, the tapered midsection of inlet chamber 140 is formed by causing the top of the inlet chamber to slope downwardly in a straight line from entrance 145 to the opposite end 155 (distal from the entrance) of the chamber, as shown in FIGS. 1 and 2B. Alternatively, the taper can follow a curve, or start at a point which is away from the entrance, as shown in FIG. 2C. In FIG. 2C, the taper begins at point 247 and slopes downwardly in a straight line to end 155. Preferably, the ratio of the height of the inlet chamber at entrance 145 to the height at end 155 is approximately 3:1.

As shown in FIG. 2A, inlet chamber 140 preferably widens slightly between entrance 145 and its midsection, such that the widest portion of the inlet chamber is approximately at the location near the center of exit 150. Also, as shown in FIG. 2A, end 155 is curved, having a generally circular arc of approximately 180°, the ends of the arc being approximately located on a line through the center of exit 150.

The outlet 150 of inlet chamber 140 is preferably circular and coaxial with the axis of GCT 10. As shown in FIG. 2A, outlet 150 is not centered in inlet chamber 140, but is offset toward end 155. The use of a circular, coaxial outlet 150 minimizes the creation of turbulence as the gas flows from inlet chamber 140 to GCT 10.

As noted, inlet chamber 140 causes the gas flow to change direction by 90° from entrance 145 to exit 150. This is accomplished in a very compact space without need for baffles or other flow impeding devices which would impair system efficiency or operation. The tapered shape of inlet chamber 140, in connection with elongate entrance 145, causes the momentum of the gas flow to be changed. Simplistically, it can be considered that the gas traveling horizontally "bounces" or reflects off of the tapered top wall 149 of inlet chamber defecting the flow in a downward direction. The constriction of narrow end 155 impedes the flow of gases to the end of the inlet chamber, such that the gas flow is diverted to outlet 150.

In the embodiment depicted in FIG. 1, the inlet apparatus of the present invention is used in connection with GCT 10, having a venturi at its entrance. The venturi, which further assists in making the gas flow in GCT 10 uniform, consists of a short inlet cone 160, a cylindrical throat 165 and a divergent outlet cone 170. After passing through the venturi, gases enter the cylindrical main body 175 of GCT 10. After conditioning in the GCT, gases leave via an exit (not shown) and may be subjected to further processing, such as in an ESP. A fan or other suitable means (not shown) may be used to propel the gases through the overall system. Whereas the flow entering the overall gas inlet system of the present invention through duct 30 may be 5,000 fpm or more, the gas flowing through the body of the GCT is reduced in speed to about 1,200 fpm.

The venturi inlet cone 160 of the present invention is unique and is designed specifically to function with inlet chamber 140. The short length of the inlet cone and the relatively steep slope of its wall act to provide additional uniformity into the gas flow prior to entering throat 165.

A spray 190 is created by a plurality of nozzles 185 (shown schematically) which are coupled to a source of liquid via a feed line 180. In the preferred embodiment, nozzles 185 are of the two-fluid type (gas/liquid), which allows independent control of the droplet size and the liquid flow volume. A typical two-fluid nozzle is connected to a source of compressed air and to a liquid supply, usually water. Suitable nozzles may be obtained from EnviroCare International, Inc., the assignee of the present invention, sold under the trademark "MICROMIST." Although nozzles 185 appear schematically in FIG. 1 as being positioned in a straight line, it is preferred that the nozzles be arranged in a circle to facilitate the even distribution of droplets in the gas flow. It is also preferred that the sprays emitted from the nozzles do not overlap. Overlapping sprays cause droplets in the various sprays to collide and agglomerate. Finally, it is preferred that the spray not reach the wall of the GCT. When the spray contacts the wall it causes a variety of problems such as droplet agglomeration, particulate accumulation and corrosion.

Preferably, the size of the droplets in spray 190 is set such that the droplets completely evaporate just prior to reaching the exit of GCT 10. It is undesirable for droplets to remain in the gas flow at the exit of the GCT so that moisture does not accumulate at the bottom of the GCT. On the other hand, if the droplets completely evaporate much before reaching the exit of the GCT, then no further treatment occurs and the length of the GCT is longer than necessary. Similarly, the volume of liquid spray is set to achieve a desired amount of cooling and humidification.

As previously described, non-uniformity in the gas flow in the GCT results in the sprays droplets behaving dramatically differently, depending on the position at which they are injected into the gas flow, and non-uniformity in the treatment of the gas flow. For example, as described above, FIG. 3 depicts the non-uniform gas flow associated with a GCT having a prior art gas inlet. The flow vectors 50 show that the speed and direction of the gas flow is highly variable within the GCT, with some locations in the GCT having a reverse gas flow. It is evident from FIG. 3 that the path of the spray droplets will be highly variable. In order to meet the design criterion that substantially all the droplets be completely evaporated prior to reaching the exit of GCT 10, it is necessary for the length of GCT 10 to equal the path of the droplets which travel the longest distance.

Because of the highly non-uniform gas flow entering GCT 10 depicted in FIG. 3, it is necessary to place the nozzle assembly well downstream of the entrance to the GCT. Thus, in a prior art GCT having an entrance venturi, the spray nozzles are located in divergent cone 130 where the gas flow is more uniform. Another aspect of the present invention lies in the ability to relocate the spray nozzles closer to the entrance to GCT 10. Thus, as depicted in FIG. 1 spray nozzles 185 are located in venturi throat 165, near the entrance to GCT 10. This relocation of spray nozzles 185 is possible because of the substantially greater uniformity of the gas flow entering the GCT associated with the present invention. Locating spray nozzles 185 near the entrance to GCT 10 allows the overall length of the GCT to be further reduced. In addition, positioning the spray nozzles within venturi throat 165, allows the spray nozzle assembly to be more compact. In a typical GCT installation there is a maintenance platform (not shown) associated with the spray nozzle assembly. Use of a compact spray nozzle assembly in the venturi throat permits the maintenance platform to be more compact, thereby saving fabrication and installation costs.

When the inlet system of the present invention is used in connection with a GCT having an entrance venturi, it is preferred that the relative dimensions be as follows. Many of the dimensions are stated in relation to the diameter "D" of throat 165 of the venturi. Circular duct 30 preferably has a diameter which is at least D. Divergent transition section 110 has a length (from its entrance at duct 30 to its exit at turning section 130) which is at least approximately 1.75 D. The rectangular exit of transition section 110, turning section 130 and the entrance to inlet chamber 140 all have a height (as indicated by "H" on FIG. 2D) that is at least approximately 0.75 D, and a width (as indicated by "W" on FIG. 2D) that is approximately 1.5 D, such that the preferred aspect ratio of the rectangular cross section of these items is approximately 2:1. (As described above, this is the preferred aspect ratio for the elongate entrance to inlet chamber 140.) The radius of curvature of turning section 130, measured at the centerline is at least approximately 1.1 D. The preferred diameter of inlet chamber exit 150, and thus the diameter at the entrance to venturi inlet cone 160, is at least approximately 1.4 D. End 155 of inlet chamber 140 has a height which is approximately 0.25 D, such that the ratio of the height of the inlet chamber at its entrance to the height at the distal end is approximately 3:1. The overall length of inlet chamber 140, i.e., the distance from entrance 145 to distal end 155 is preferably no greater than about twice the width of the inlet chamber, and is preferably about 1.5 times the width. The wall of venturi inlet cone 160 preferably has an angle of approximately 35°–45° between its entrance at inlet chamber exit 150 and throat 165. (Although inlet cone 160 is shown as having a straight wall, it is contemplated that inlet cone 160 could also have curved walls to further improve gas flow uniformity.) Venturi throat 165 has a length which is approximately equal to its diameter The preferred wall angle of venturi divergent cone is approximately 7°.

While the present invention has been described in connection with the preferred embodiments thereof, those skilled in the art will appreciate that many modifications and changes may be made without departing from the invention. For example, the inlet chamber of the present invention has been described as changing the direction of gas flow by 90°. However, those skilled in the art will appreciate that the inlet chamber of the present invention is useful for changing the gas flow over a wide range of angles. In particular, the inlet chamber provides substantial benefits whenever the gas flow must be changed by as little as 60°.

What is claimed is:

1. A gas inlet chamber for providing a uniform flow of a gas to a gas processing apparatus, comprising:
   an elongate entrance for receiving a flow of gas;
   a substantial circular outlet coupled to the entrance to the gas processing apparatus, said outlet having a different orientation than said elongate entrance such that gases flowing between said elongate entrance and said outlet are redirected; and
   a body portion between said elongate entrance and said outlet, said body portion comprising a tapered portion in the region of said outlet, with the narrowest height of said tapered portion being distal from said elongate entrance.

2. The gas inlet chamber of claim 1 wherein the gas flow through said gas inlet chamber is redirected by about ninety degrees.

3. The gas inlet chamber of claim 1 wherein the axis of said circular outlet is coaxial with the axis of the gas processing apparatus.

4. The gas inlet chamber of claim 1 wherein the height of the tapered portion decreases uniformly from said entrance to an end of the inlet apparatus distal from said entrance.

5. A gas inlet chamber for providing a uniform flow of a gas to a gas conditioning tower having a venturi at the entrance thereof, comprising:
   a rectangular entrance and having an aspect ratio of at least about 2:1, and wherein the direction of gas flow into said entrance is substantially different than the direction of gas flow through the gas conditioning tower,
   a tapered body extending from said entrance to an end which is opposite from said entrance, the height of the tapered body decreasing from said entrance to said opposite end, and
   a substantially circular outlet formed in said tapered body, said outlet being coupled to the entrance to said gas conditioning tower, said substantially circular outlet being coaxially aligned with the gas conditioning tower.

6. The gas inlet chamber of claim 5 wherein the length of the gas inlet chamber is less than two times the width of the opening of said rectangular entrance.

7. The gas inlet chamber of claim 5 wherein the height of the chamber at said rectangular entrance is at least twice the height at said end opposite said rectangular entrance.

8. A system for redirecting and providing a uniform flow of gas into a gas processing apparatus, comprising:

a divergent transition section for receiving a flow of gas traveling in a first direction;

a gas turning section coupled to said divergent transition section for changing the direction of gas flow; and an inlet chamber coupled to said gas turning section for further changing the direction of gas flow and for providing a uniform flow of gas to the gas processing apparatus, said inlet chamber comprising an elongate entrance aperture, a tapered body and a substantially circular outlet coupled to the gas processing apparatus.

9. The system of claim 8 wherein the direction of gas flow into said divergent transition system is vertically upward and the direction of gas flow into said gas processing apparatus is vertically downward.

10. A gas treatment system, comprising:

divergent gas flow transition means for receiving a generally upward flow of gas and reducing the flow rate of the gas, gas flow turning means for changing the direction of said gas flow from generally vertical to generally horizontal;

gas flow inlet means comprising an elongate entrance aperture, a tapered midsection and a generally circular outlet for changing the direction of gas flow from generally horizontal to vertically downward and for providing a uniform flow of gas to the entrance of a gas treatment apparatus.

11. The gas treatment system of claim 10 wherein the entrance of said gas treatment apparatus comprises a venturi.

12. The gas treatment system of claim 11 further comprising nozzle means positioned within the throat of said venturi for spraying water into the gas flow.

13. A gas inlet chamber for providing a uniform flow of a gas to a gas processing apparatus, comprising:

an elongate entrance for receiving a flow of gas;

a substantial circular outlet coupled to the entrance to the gas processing apparatus, said outlet having a different orientation than said elongate entrance such that gases flowing between said elongate entrance and said outlet are redirected; and a body portion between said elongate entrance and said outlet, said body portion comprising a tapered portion in the region of said outlet, with the narrowest height of said tapered portion being distal from said elongate entrance, and where said elongate entrance is rectangular.

14. A gas inlet chamber for providing a uniform flow of a gas to a gas processing apparatus, comprising:

an elongate entrance for receiving a flow of gas;

a substantial circular outlet coupled to the entrance to the gas processing apparatus, said outlet having a different orientation than said elongate entrance such that gases flowing between said elongate entrance and said outlet are redirected; and a body portion between said elongate entrance and said outlet, said body portion comprising a tapered portion in the region of said outlet, with the narrowest height of said tapered portion being distal from said elongate entrance, and where the aspect ratio of said elongate entrance is at least about 2:1.

15. A gas inlet chamber for providing a uniform flow of a gas to a gas processing apparatus, comprising:

an elongate entrance for receiving a flow of gas;

a substantial circular outlet coupled to the entrance to the gas processing apparatus, said outlet having a different orientation than said elongate entrance such that gases flowing between said elongate entrance and said outlet are redirected; and a body portion between said elongate entrance and said outlet, said body portion comprising a tapered portion in the region of said outlet, with the narrowest height of said tapered portion being distal from said elongate entrance, and wherein the entrance to the gas processing apparatus is a venturi with a substantially cylindrical throat having a diameter D, and where the height of the elongate entrance is no greater than about 0.75 D.

16. The gas inlet chamber of claim 15 wherein the diameter of the circular outlet is greater than about 1.2 D.

17. The gas inlet chamber of claim 16 wherein the narrowest height of the tapered portion is about 0.25 D or less.

18. A system for redirecting and providing a uniform flow of gas into a gas processing apparatus, comprising:

a divergent transition section for receiving a flow of gas traveling in a first direction;

a gas turning section coupled to said divergent transition section for changing the direction of gas flow; and an inlet chamber coupled to said gas turning section for further changing the direction of gas flow and for providing a uniform flow of gas to the gas processing apparatus, said inlet chamber comprising an elongate entrance aperture, a tapered body and a substantially circular outlet coupled to the gas processing apparatus, and where the length of said inlet chamber is less than about two times the width of said elongate entrance.

19. A system for redirecting and providing a uniform flow of gas into a gas processing apparatus, comprising:

a divergent transition section for receiving a flow of gas traveling in a first direction;

a gas turning section coupled to said divergent transition section for changing the direction of gas flow; and an inlet chamber coupled to said gas turning section for further changing the direction of gas flow and for providing a uniform flow of gas to the gas processing apparatus, said inlet chamber comprising an elongate entrance aperture, a tapered body and a substantially circular outlet coupled to the gas processing apparatus, and where the aspect ratio of said tapered portion of said inlet chamber is at least about 2:1.

20. A system for redirecting and providing a uniform flow of gas into a gas processing apparatus, comprising:

a divergent transition section for receiving a flow of gas traveling in a first direction;

a gas turning section coupled to said divergent transition section for changing the direction of gas flow; and an inlet chamber coupled to said gas turning section for further changing the direction of gas flow and for providing a uniform flow of gas to the gas processing apparatus, said inlet chamber comprising an elongate entrance aperture, a tapered body and a substantially circular outlet coupled to the gas processing apparatus, and where the aspect ratio of said elongate entrance to said inlet chamber is at least about 2:1.

21. A gas conditioning system, comprising:

a gas inlet chamber for providing a uniform flow of gas comprising:

an elongate entrance for receiving a flow of gas;

a substantial circular outlet, said outlet having a different orientation than said elongate entrance such that gases flowing between said elongate entrance and said outlet are redirected; and a body portion between said elongate entrance and said outlet, said body portion comprising a tapered portion in the region of said outlet, with the narrowest height of said tapered portion being distal from said elongate entrance; and a gas conditioning tower having an inlet for receiving said provided uniform flow of gases, wherein said provided uniform flow of gases generally flow in the downward direction, said gas conditioning tower comprising a venturi at the inlet thereto and having a plurality of nozzles positioned within the throat of said venturi for spraying a liquid into the gas flow.

* * * * *